US012663204B2

(12) United States Patent
Zhang et al.

(10) Patent No.: US 12,663,204 B2
(45) Date of Patent: Jun. 23, 2026

(54) REFRIGERATION DEVICE HAVING MAGNETIC FIELD FRESHNESS-PRESERVING APPARATUS

(71) Applicants: QINGDAO HAIER REFRIGERATOR CO., LTD., Qingdao (CN); HAIER SMART HOME CO., LTD., Qingdao (CN)

(72) Inventors: Yuning Zhang, Qingdao (CN); Lisheng Ji, Qingdao (CN); Bin Fei, Qingdao (CN); Mengcheng Li, Qingdao (CN); Yao Yi, Qingdao (CN); Zilin Cao, Qingdao (CN)

(73) Assignees: QINGDAO HAIER REFRIGERATOR CO., LTD., Qingdao (CN); HAIER SMART HOME CO., LTD., Qingdao (CN)

( * ) Notice: Subject to any disclaimer, the term of this patent is extended or adjusted under 35 U.S.C. 154(b) by 201 days.

(21) Appl. No.: 18/720,448

(22) PCT Filed: Nov. 15, 2022

(86) PCT No.: PCT/CN2022/132083
§ 371 (c)(1),
(2) Date: Jun. 14, 2024

(87) PCT Pub. No.: WO2023/109410
PCT Pub. Date: Jun. 22, 2023

(65) Prior Publication Data
US 2025/0044014 A1 Feb. 6, 2025

(30) Foreign Application Priority Data

Dec. 15, 2021 (CN) .......................... 202111539182.6

(51) Int. Cl.
*F25D 23/12* (2006.01)
*A23B 4/015* (2006.01)
(Continued)

(52) U.S. Cl.
CPC .............. *F25D 23/12* (2013.01); *A23B 4/015* (2013.01); *A23B 4/06* (2013.01); *F25D 17/08* (2013.01);
(Continued)

(58) Field of Classification Search
CPC ........ F25D 25/023; F25D 23/12; F25D 31/00; F25D 31/005
See application file for complete search history.

(56) References Cited

U.S. PATENT DOCUMENTS

2002/0104325 A1 8/2002 Mandel et al.
2013/0160467 A1 6/2013 Hall et al.

FOREIGN PATENT DOCUMENTS

CN 201628439 U 11/2010
CN 103954092 A 7/2014
(Continued)

*Primary Examiner* — Christopher R Zerphey
(74) *Attorney, Agent, or Firm* — MUNCY, GEISSLER, OLDS & LOWE, P.C.

(57) ABSTRACT

A refrigeration device having a magnetic field freshness-preserving apparatus, includes a cabinet defining a storage chamber, a back part of the storage chamber having a refrigeration air duct; and a magnetic field freshness-preserving apparatus having a magnetic field component used to apply a magnetic field to a freshness-preserving space inside the storage chamber. The magnetic field freshness-preserving apparatus includes a barrel body, an air intake port and an air return port in communication with the refrigeration air duct; and a drawer defining a freshness-preserving space. The magnetic field freshness-preserving unit is configured to form a surrounding air duct that allows airflow to flow from the air inlet port sequentially through a (Continued)

top wall of the barrel body, a front baffle of the drawer, and a space below a bottom plate of the drawer, and back to the air return port, so as to refrigerate the freshness-preserving space.

9 Claims, 6 Drawing Sheets

(51) Int. Cl.
A23B 4/06 (2006.01)
F25D 17/08 (2006.01)
F25D 25/02 (2006.01)

(52) U.S. Cl.
CPC ........ F25D 25/025 (2013.01); *F25D 2300/00* (2013.01); *F25D 2317/061* (2013.01); *F25D 2317/063* (2013.01); *F25D 2700/121* (2013.01)

(56) References Cited

FOREIGN PATENT DOCUMENTS

| | | |
|---|---|---|
| CN | 104251586 A | 12/2014 |
| CN | 106123467 A | 11/2016 |
| CN | 106679265 A | 5/2017 |
| CN | 206670156 U | 11/2017 |
| CN | 208332808 U | 1/2019 |
| CN | 214250298 U | 9/2021 |
| CN | 113494809 A | 10/2021 |
| CN | 214536999 U | 10/2021 |
| CN | 217031740 U | 7/2022 |
| CN | 217031741 U | 7/2022 |
| EP | 3872430 A1 | 9/2021 |
| JP | H0534653 U | 5/1993 |
| JP | 2008045845 A | 2/2008 |
| JP | 2010127544 A | 6/2010 |
| JP | 2013044446 A | 3/2013 |
| JP | 2014-115038 A | 6/2014 |

REFRIGERATION DEVICE HAVING MAGNETIC FIELD FRESHNESS-PRESERVING APPARATUS

CROSS-REFERENCE TO RELATED APPLICATIONS

The present application is a national phase entry of International Application No. PCT/CN2022/132083, filed Nov. 15, 2022, which claims priority to Chinese Patent Application No. 202111539182.6, filed Dec. 15, 2021, which are incorporated herein by reference in their entirety.

TECHNICAL FIELD

The present application relates to refrigeration and freezing equipment, and more particularly relates to a refrigeration device having a magnetic field freshness-preserving apparatus.

BACKGROUND

Conventional refrigeration device (including refrigerators, freezers, cold cabinets, etc.) tend to cause loss of juices in meat, fish, shrimp, and other foodstuffs during storage, thereby leading to the deterioration of fish and shrimp meat, and resulting in nutrient loss and poorer taste.

Recent studies have shown that magnetic fields can inhibit the growth of microorganisms and molds, thereby extending the storage period of food. Therefore, magnetic fields can be used to assist in food storage, thereby extending the storage period. When using magnetic fields to assist in food storage, the magnetic field restricts a free path of water molecules to a certain extent, specifically by breaking the hydrogen bonds in the water molecule clusters. This inhibits the growth of ice nuclei during phase change, with an ice crystal growth rate being higher than a migration rate of water molecules, thereby resulting in smaller ice crystals. This reduces cell damage and lowers the rate of juice loss in the food, thereby better preserving the nutrients and taste of the food.

To achieve preservation storage, the magnetic field needs to be coordinated with the storage temperature. Practical tests show that for non-freezing preservation storage, it is best to maintain the storage temperature at 5-8 degrees Celsius, and a cooling rate needs to be relatively stable. However, during the process of applying the magnetic field to the preservation space, a magnetic field generating device (generally an electromagnetic device) generates heat, thereby leading to temperature fluctuations that affect a storage quality.

Reference to any prior art in the specification is not, and should not be taken as, an acknowledgment or any form of suggestion that this prior art forms part of the common general knowledge in Europe or any other jurisdiction or that this prior art could reasonably be expected to be understood and regarded as relevant by a person skilled in the art.

SUMMARY

An object of the present application is to provide a refrigeration device having a magnetic field freshness-preserving apparatus that improves refrigeration performance.

Another object of the present application is to make the refrigeration device having a magnetic field freshness-preserving apparatus compact in structure, thereby increasing the usable volume.

A further object of the present application is to make the temperature in the freshness-preserving space of the magnetic field freshness-preserving apparatus uniform.

In particular, the present application is directed to a refrigeration device having a magnetic field freshness-preserving apparatus, comprising:

a cabinet, in which a storage chamber is defined, with a refrigeration air duct for providing refrigeration airflow arranged at a back of the storage chamber;

a magnetic field freshness-preserving apparatus, arranged in the storage chamber, provided with a magnetic field component for applying a magnetic field to a freshness-preserving space inside itself; and the magnetic field freshness-preserving apparatus comprising:

a barrel body defining an air intake port and an air return port at a rear part thereof, and the air intake port and the air return port communicated with the refrigeration air duct;

a drawer slidably arranged inside the barrel body, and defining the freshness-preserving space inside thereof; and wherein the magnetic field freshness-preserving apparatus is configured to form a surrounding air duct that allows airflow to flow from the air intake port sequentially through a top wall of the barrel body, a front baffle of the drawer, and a lower space below a bottom plate of the drawer, and return to the air return port to refrigerate the freshness-preserving space.

Further, the top wall of the barrel body comprises:

a drawer top cover, opposite to a top opening of the drawer;

an outer shell plate, arranged above the drawer top cover, with a first interval between the outer shell plate and the drawer top cover;

a top insulation plate, arranged in the first interval, with a space between the top insulation plate and the drawer top cover forming a top section of the surrounding air duct passing through the top wall of the barrel body; and a plurality of through holes arranged on the drawer top cover to communicated the freshness-preserving space with the top section through the through holes.

Further, a plurality of air guide ribs are formed on a side of the top insulation plate facing towards the drawer top cover to guide the airflow in the top section, thereby ensuring that the airflow evenly flows through the top section.

Further, the magnetic field component comprises a first magnetically conductive plate and a first magnetic component arranged on the drawer top cover, the first magnetic component is flat and arranged close to the first magnetically conductive plate.

Further, the magnetic field component comprises a second magnetically conductive plate and a second magnetic component arranged on a bottom wall of the barrel body, the second magnetic component is flat and abutted against to the second magnetically conductive plate, the first magnetically conductive plate and the second magnetically conductive plate are arranged opposite to each other, and the magnetic field component further comprises:

a magnetically conductive tape arranged on the side wall of the barrel body, connecting the first magnetically conductive plate and the second magnetically conductive plate to form an annular magnetic circuit around the drawer. magnetically conductive Further, the refrigeration device having the magnetic field freshness-preserving apparatus further comprising:

a first temperature detection component and a second temperature detection component, respectively arranged inside the drawer top cover, and wherein the first temperature detection component is located near the air intake port, the second temperature detection component is located near the front baffle of the drawer.

Further, the front baffle of the drawer comprises:

a middle partition;

an air duct member arranged on the side of the middle partition facing the freshness-preserving space, together with the middle partition defining the front section of the surrounding air duct passing through the front baffle, with the top portion of the air duct member connected to the front baffle air inlet of the top section;

a panel arranged on a side of the middle partition opposite to the freshness-preserving space, an air insulation space is forming between the panel and the middle partition.

Further, the top wall of the barrel body further comprises:

an air guide element arranged at a front end of the top wall of the barrel body, a first air guide opening at a rear portion of the air guide element is communicated with a front end of the top section, a bottom portion of the air guide element is opposite to the front baffle air inlet, a second air guide opening is arranged at the bottom portion of the air guide element and communicated with the front baffle air inlet, to guide the airflow of the top section into the front section, the bottom portion of the air guide element and the top portion of the air duct member respectively set as inclined surfaces sloping downwards from front to back.

Further, the drawer bottom plate and the bottom wall of the barrel body are spaced apart to form the lower space, for serving as the bottom section of the surrounding air duct:

the front part of the drawer bottom plate has a front baffle air outlet corresponding to the bottom end of the air duct member, connecting the bottom section through the front baffle air outlet.

Further, the rear wall of the barrel body is spaced apart from the back of the storage chamber, and the air return port is arranged in the middle of the rear wall; and the top end of the rear wall extends obliquely towards the rear end of the top wall of the barrel body to form an oblique extension surface, and the air intake port is arranged on the oblique extension surface.

Based on the aforementioned description, it can be understood by those skilled in the art that in the technical solution of the present application, the magnetic field freshness-preserving apparatus is arranged in the storage chamber of the refrigeration device and is provided with a magnetic field component for applying a magnetic field to the freshness-preserving space inside itself. The magnetic field helps improve storage quality, can shorten the freezing time, reduce the rate of juice loss and nutrient loss in the food, lower the number of microorganisms and bacteria, and extend the preservation period. The magnetic field freshness-preserving apparatus is configured to form a surrounding air duct that allows airflow to flow from the air intake port sequentially through a top wall of the barrel body, a front baffle of the drawer, and a lower space below a bottom plate of the drawer, and return to the air return port to refrigerate the freshness-preserving space. Using the surrounding air duct to refrigerate the freshness-preserving space, the cold air can also promptly remove the heat generated by the magnetic components (such as electromagnetic elements), thereby avoiding temperature fluctuations in the freshness-preserving space and improving the preservation effect on food in the freshness-preserving space by combining the effects of temperature and the magnetic field.

Further, the surrounding air duct can also avoid cold air directly blowing the food in the freshness-preserving space, avoid the food temperature falling too fast, avoid the food being frozen and the storage quality declining, help to evenly cool down, and take away the heat generated by magnetic parts such as electromagnetic coils, thereby reducing temperature fluctuations.

Further, the refrigeration equipment of the present application optimizes and improves the structure of the barrel body and drawer of the magnetic field freshness-preserving apparatus, has a compact structure, and reduces the occupation of storage space.

The above and other objects, advantages and features of the present application will become more apparent to those skilled in the art from the following detailed description of specific embodiments thereof taken in conjunction with the accompanying drawings.

As used herein, except where the context clearly requires otherwise, the term "comprise" and variations of the term, such as "comprising", "comprises" and "comprised", are not intended to exclude further features, components, integers or steps.

BRIEF DESCRIPTION OF DRAWINGS

Some specific embodiments of the application will be described in detail hereinafter by way of example and not by way of limitation with reference to the accompanying drawings. The same reference numerals identify the same or similar components or parts in the drawings. Those skilled in the art should appreciate that the drawings are not necessarily drawn to scale. In the drawings.

DETAILED DESCRIPTION OF EMBODIMENTS

Figure 1:
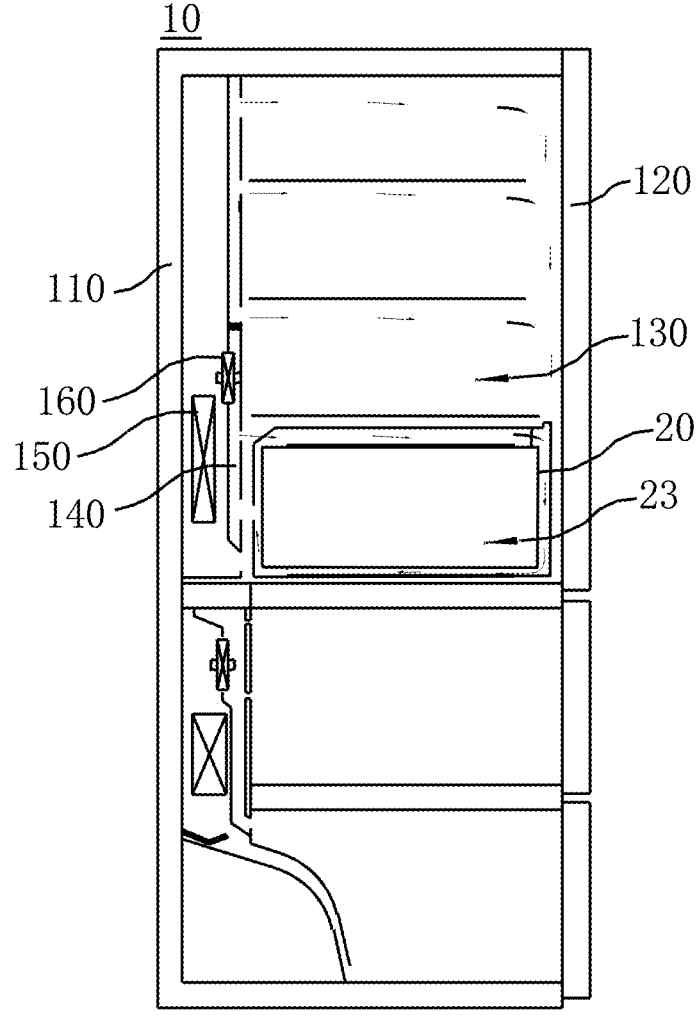
FIG. 1 is a schematic diagram of refrigeration device according to an embodiment of the present application.

Those skilled in the art should understand that the embodiments described below are only a part of embodiments of the present application rather than all embodiments of the present application. This part of embodiments is intended to explain the technical principle of the present application rather than to restrict the protection scope thereof. All other embodiments achieved by those of ordinary skills in the art, based on the embodiments of the present application without creative work, shall fall within the protection scope of the present application.

In the description of the present application, it should be understood that, orientation or position relationships indicated by the terms "center", "upper", "lower", "top", "bottom", "left" "right", "vertical", "horizontal", "inner", "outer" etc. are based on the orientation or position relationships shown in the drawings, for ease of the description of the present application rather than indicating or implying that the indicated device or element must have a particular orientation or be constructed and operated in a particular orientation. Therefore, these terms should not be understood as limitations to the present application. In addition, the terms such as "first", "second" and "third" are merely for a descriptive purpose, and cannot be understood as indicating or implying relative importance.

Further, in the description of the present application, unless otherwise explicitly defined or limited, the terms "install", "connected with", "connected to" should be comprehended in a broad sense. For example, they may refer to a fixed connection, detachable connection or integrated connection, or may be a mechanical connection or electrical connection, or may refer to a direct connection or an indirect connection via an intermediary, or may be an internal communication of two elements. The specific meanings about the foregoing terms in the present application may be understood by those skilled in the art according to specific circumstances.

The refrigeration device of the present application comprises refrigerators, freezers, and cold cabinets used for the refrigeration storage of items. The refrigerator form is taken as an example in the figures of this embodiment, and those skilled in the art can realize other refrigeration device such as freezers and cold cabinets based on the introduction of this embodiment. The following is a detailed description of the refrigeration device of the present application with reference to the accompanying drawings.

FIG. 1 is a schematic diagram of refrigeration device according to one embodiment of the present application. The refrigeration device 10 is a refrigerator and comprises: a cabinet 110, a door 120, and a refrigeration system (not shown), the cabinet 110 defines at least one storage chamber 130 opening forward, and there are usually more than one storage chamber 130, such as a refrigeration storage chamber, a freezing storage chamber, and a variable temperature storage chamber. The number and functions of the specific storage chambers 130 can be configured according to prior needs.

The refrigeration device 10 can use an air-cooled refrigeration method to refrigerate the storage chambers 130. That is, an air circulation system is provided in the cabinet 110, using a fan 160 to deliver the refrigeration airflow that has been heat-exchanged by a heat exchanger (evaporator) 150 through an air outlet to the storage chambers 130, and then returning through the air return port 232 to the air duct to achieve refrigeration. In some embodiments, a refrigeration air duct 140 providing refrigeration airflow can be arranged at a back of the storage chambers 130, and the heat exchanger 150 can be arranged in the refrigeration air duct 140 to exchange heat with the passing airflow. A fan 160 can also be arranged in the refrigeration air duct 140 to facilitate the formation of the aforementioned circulating refrigeration airflow.

Optionally, there can be a plurality of storage chambers, and at least one of the plurality of storage chambers can be equipped with a magnetic field freshness-preserving apparatus 20. Those skilled in the art can configure a refrigeration system and air circulation system as needed for the storage chambers, for example, one heat exchanger 150 can be configured for one storage chamber, or one heat exchanger 150 can be configured for two or more storage chambers.

Since the cabinet, door, and refrigeration system of such refrigerators are well-known and easy to realize for those skilled in the art, they can be selected according to needs. To avoid obscuring the inventive points of this application, the cabinet 110, the door 120, and refrigeration system itself will not be further described.

The magnetic field freshness-preserving apparatus 20 is arranged inside one storage chamber 130 and is provided with a magnetic field component for applying a magnetic field to the freshness-preserving space 23 inside itself. The intensity range of the magnetic field can be set to 1-100 Gauss. When applied to a freezing environment, the magnetic field intensity range can preferably be 5-60 Gauss, such as around 20 Gauss; when applied to a refrigeration environment, the magnetic field intensity range can be 20-160 Gauss, preferably 40-80 Gauss, such as around 60 Gauss. The magnetic field component can use permanent magnet parts or electromagnetic parts, i.e., using electromagnetic coils or permanent magnets to generate a magnetic field. In some embodiments, a combination of electromagnetic coils and permanent magnets can also be used to generate a magnetic field.

Figure 2:
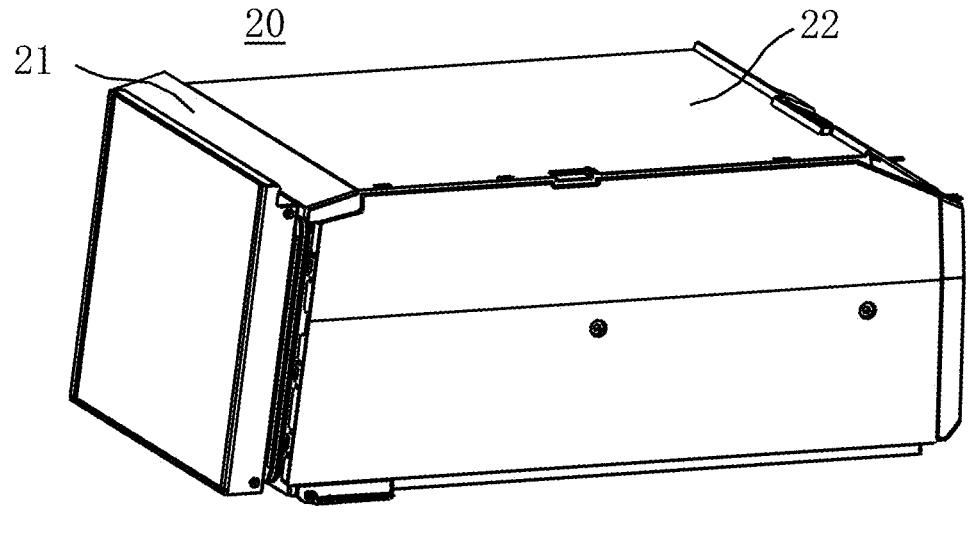
FIG. 2 is a schematic diagram of the magnetic field freshness-preserving apparatus in the refrigeration device according to one embodiment of the present application.
Figure 3:
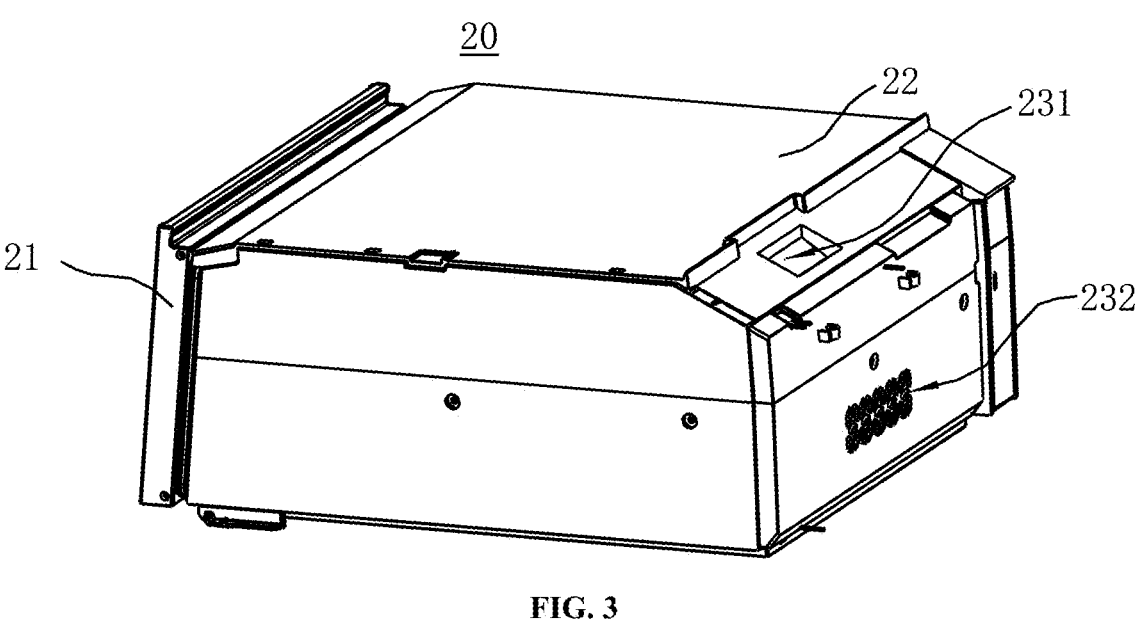
FIG. 3 is a schematic diagram of the magnetic field freshness-preserving apparatus shown in FIG. 2 from another perspective.
Figure 4:
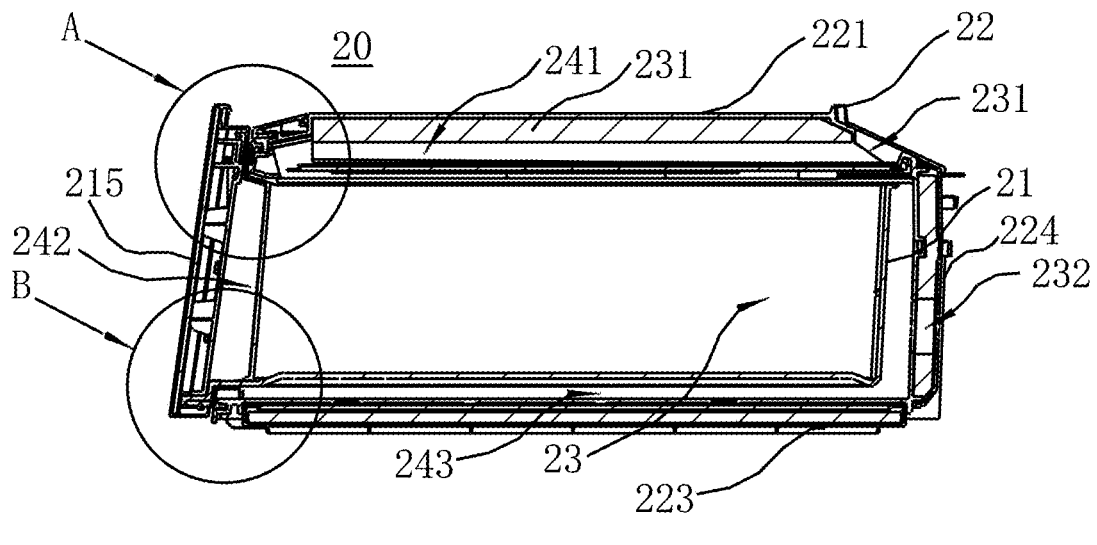
FIG. 4 is a side cross-sectional view of the magnetic field freshness-preserving apparatus in the refrigeration device according to one embodiment of the present application.
Figure 5:
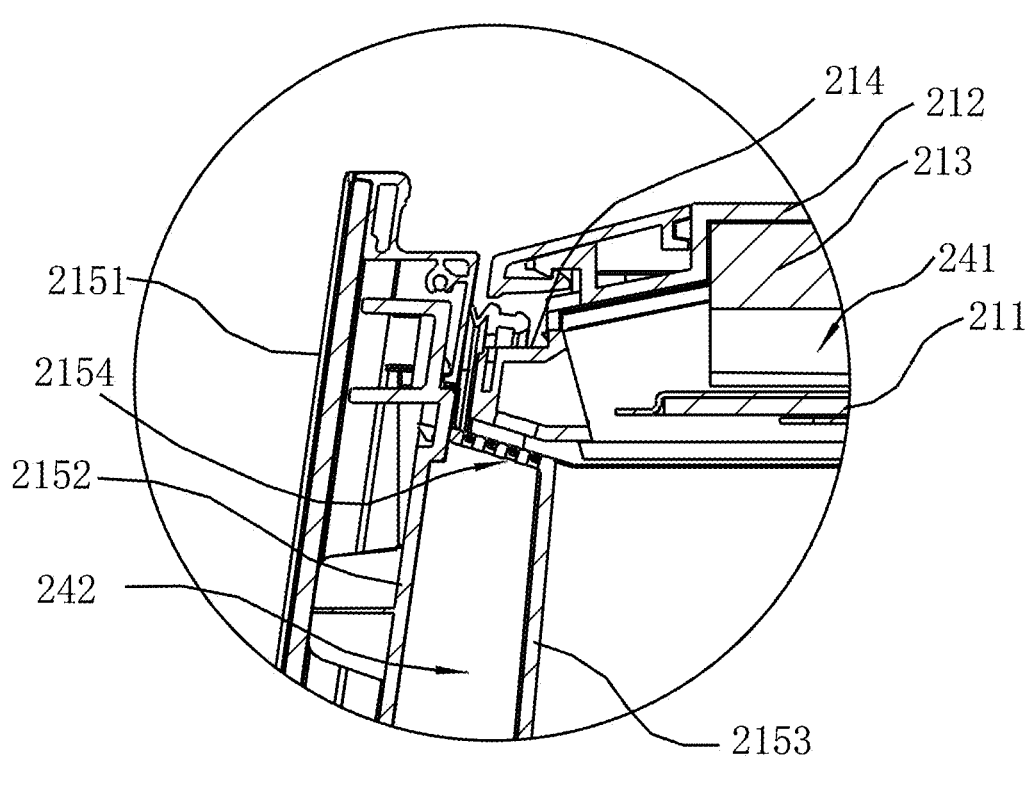
FIG. 5 is an enlarged partial view of part A in FIG. 4.
Figure 6:
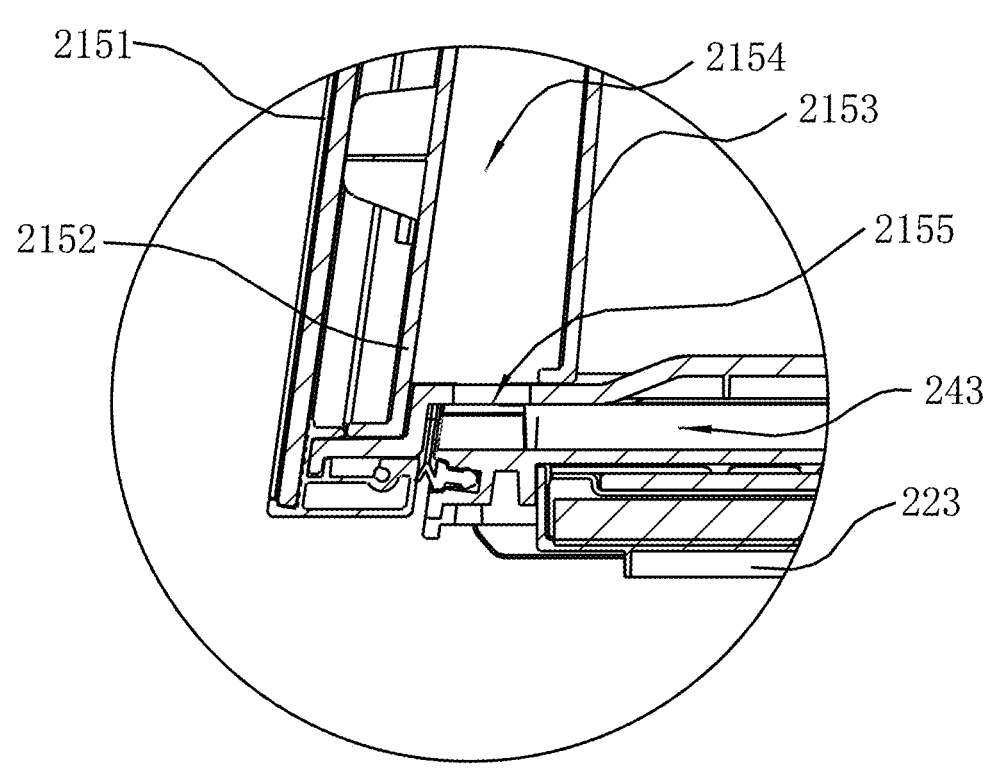
FIG. 6 is an enlarged partial view of part B in FIG. 4.

FIG. 2 is a schematic diagram of the magnetic field freshness-preserving apparatus 20 in the refrigeration device 10 according to one embodiment of the present application; FIG. 3 is a schematic diagram of the magnetic field freshness-preserving apparatus 20 shown in FIG. 2 from another perspective. FIG. 4 is a side cross-sectional view of the magnetic field freshness-preserving apparatus 20 in the refrigeration device 10 according to one embodiment of the present application. FIG. 5 is an enlarged partial view of part A in FIG. 4: FIG. 6 is an enlarged partial view of part B in FIG. 4.

The magnetic field freshness-preserving apparatus 20 can be configured as a drawer. For example, the magnetic field freshness-preserving apparatus 20 comprises a barrel body 22 and a drawer 21. The rear part of the barrel body 22 forms an air intake port 231 and an air return port 232 communicated with the refrigeration air duct 140. The drawer 21 is slidably arranged in the barrel body 22, and defines the freshness-preserving space 23 therein. The freshness-preserving space 23 inside the drawer 21 can realize the magnetic field preservation function through magnetic field and temperature control.

The magnetic field freshness-preserving apparatus 20 is configured to form a surrounding air duct that allows airflow to flow from the air intake port 231 sequentially through a top wall 221 of the barrel body 22, a front baffle 215 of the drawer 21, and a lower space below a bottom plate of the drawer, and return to the air return port 232 to refrigerate the freshness-preserving space 23. The surrounding air duct enters the magnetic field freshness-preserving apparatus 20 from the air intake port 231 at a top rear end of the magnetic field freshness-preserving apparatus 20, flows through the top wall 221 of the barrel body 22, then enters a top of the front baffle 215 of the drawer 21, flows through the front baffle 215 of the drawer 21 and then into the lower space below the drawer bottom plate, and then returns to the air return port 232 located at the rear wall 224 of the barrel body 22, completing the airflow circulation. A section of the surrounding air duct that passes through the top wall 221 of the barrel body 22, i.e., a section located at the top of the magnetic field freshness-preserving apparatus 20, is referred to as a top section 241. A section of the surrounding air duct that passes through the front baffle 215 of the drawer 21, i.e., a section located at the front of the magnetic field freshness-preserving apparatus 20, is referred to as a front section 242. A section of the surrounding air duct that passes through the lower space below the drawer bottom plate, i.e., a section located at the bottom of the magnetic field freshness-preserving apparatus 20, is referred to as a bottom section 243. The surrounding air duct forms an airflow path surrounding the freshness-preserving space 23 from front to back, effectively achieving uniform cooling.

The top wall 221 of the barrel body 22 comprises a drawer top cover 211, an outer shell plate 212, and a top insulation plate 213. The top wall 221 of the barrel body 22 is sequentially from top to bottom: the outer shell plate 212, the top insulation plate 213, and the drawer top cover 211.

The air return port 232 can be arranged in the middle of the rear wall 224 of the barrel body 22. The top end of the rear wall 224 extends obliquely towards the rear end of the top wall 221 of the barrel body 22 to form an oblique extension surface, and the air intake port 231 is arranged on the oblique extension surface. The positions of the air intake port 231 and the air return port 232 make the cooperation between the magnetic field freshness-preserving apparatus 20 and the air duct of the refrigeration device 10 smoother, thereby improving the air delivery efficiency. Additionally, the air intake port 231 is arranged at a top rear end of the drawer 21 and tilted to reduce the occupation of the freshness-preserving space 23 by the air delivery structure, thereby making the structure more compact and efficient.

The drawer top cover 211 is opposite to a top opening of the drawer 21 and is used for sealing the top space of the freshness-preserving space 23. The outer shell plate 212 is arranged above the drawer top cover 211, a first interval is formed between the outer shell plate 212 and the drawer top cover 211. The top insulation plate 213 is arranged in the first interval, and the space between the top insulation plate 213 and the drawer top cover 211 forms the top section 241 of the surrounding air duct passing through the top wall 221 of the barrel body 22. The drawer top cover 211 is further provided with a plurality of through holes to communicated the freshness-preserving space 23 with the top section 241 through the through holes. The diameter of the through holes can be set to be small, so that the refrigeration airflow can evenly enter the freshness-preserving space 23, thereby avoiding direct blowing on the stored items in the freshness-preserving space 23.

The top insulation plate 213 is further provided with a plurality of air guide ribs 2131 on a side facing towards the drawer top cover 211 to guide the airflow in the top section 241, thereby ensuring that the airflow evenly flows through the top section 241.

For easy manufacturing, the barrel body 22 can be formed as an upper and lower or a left and right split inner barrel body, fixed by dedicated clasps or screws, or it can be formed as an integral barrel body. The inner side of a side wall of the barrel body 22 is provided with an installation structure corresponding to the drawer 21, such as rails or slideways.

The outer side of the surrounding air duct of the barrel body 22 is provided with insulation elements, such as the top insulation plate 213, the middle partition 2152, the bottom insulation plate, and the rear wall insulation plate, thereby avoiding loss of cooling capacity and improving refrigeration efficiency.

Figure 7:
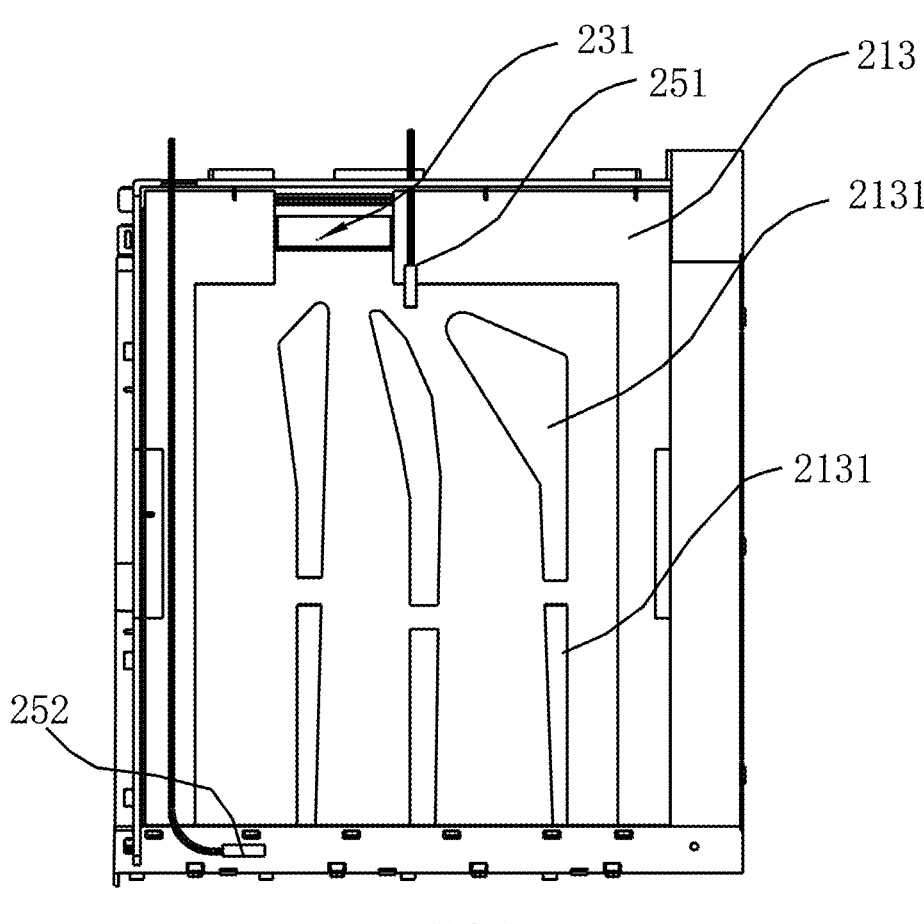
FIG. 7 is a schematic diagram of a top section of the surrounding air duct of the magnetic field freshness-preserving apparatus in the refrigeration device according to one embodiment of the present application.

FIG. 7 is a schematic diagram of the top section 241 of the surrounding air duct of the magnetic field freshness-preserving apparatus 20 in the refrigeration device 10 according to one embodiment of the present application. The refrigeration device 10 having the magnetic field freshness-preserving apparatus 20 further comprises a first temperature detection component 251 and a second temperature detection component 252. The first temperature detection component 251 and the second temperature detection component 252 are respectively arranged inside the drawer top cover 211, the first temperature detection component 251 is located near the air intake port 231, and the second temperature detection component 252 is located near the front baffle 215 of the drawer 21. The first temperature detection component 251 and the second temperature detection component 252 can accurately detect the temperature inside the freshness-preserving space 23, thereby providing a basis for accurate temperature control.

In other embodiments, the first temperature detection component 251 can be arranged in the drawer top cover 211, and the second temperature detection component 252 can be arranged at the bottom section 243 of the surrounding air duct, i.e., at the bottom wall 223 of the barrel body 22, thereby reflecting the temperature state at different positions in the freshness-preserving space 23.

The drawer top cover 211 is provided with receiving grooves on a side facing towards the top section 241 of the surrounding air duct to accommodate the first temperature detection component 251 and the second temperature detection component 252. An optional temperature control method is: when the temperature sensed by the first temperature detection component 251 is higher than a predetermined preservation temperature, the air supply to the magnetic field freshness-preserving apparatus 20 is turned on. When the temperature sensed by the second temperature detection component 252 is lower than the required predetermined preservation temperature for the food, the air supply to the magnetic field freshness-preserving apparatus 20 is stopped.

Figure 8:
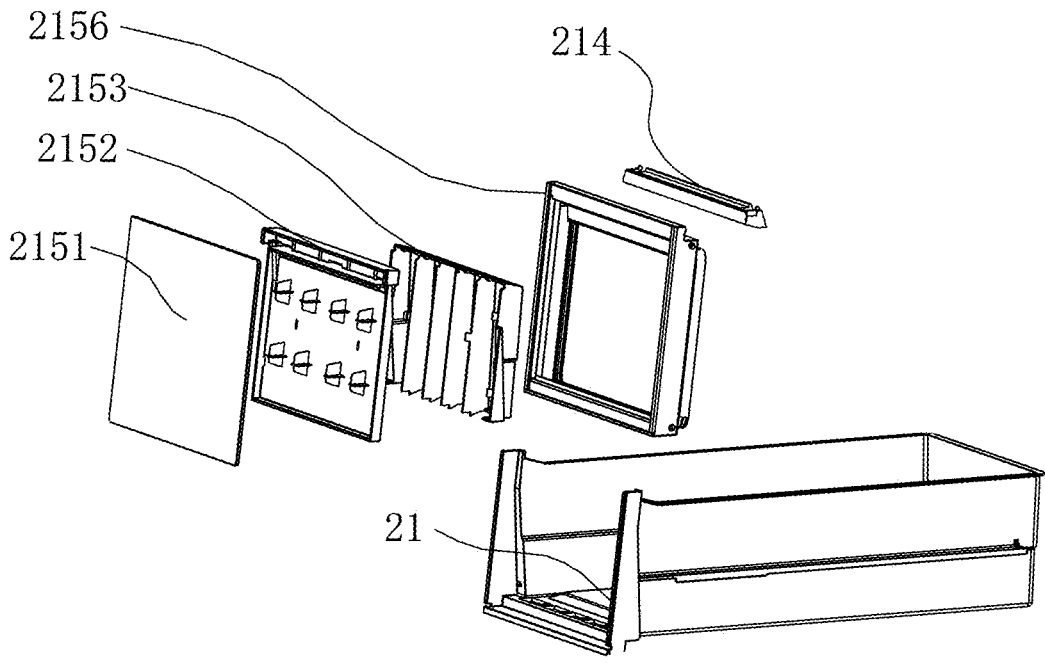
FIG. 8 is an exploded view of the drawer of the magnetic field freshness-preserving apparatus in the refrigeration device according to one embodiment of the present application.

FIG. 8 is an exploded view of the drawer 21 of the magnetic field freshness-preserving apparatus 20 in the refrigeration device 10 according to one embodiment of the present application. The front baffle 215 of the drawer 21 can comprise a middle partition 2152, an air duct member 2153, a panel 2151, and an outer frame 2156. From front to back, there are the panel 2151, the middle partition 2152, and the outer frame 2156. The outer frame 2156 serves as the outer frame of the front baffle 215 of the drawer 21 and can have a support frame and a decorative strip on the outer side of the support frame. The front baffle 215 of the drawer 21 closes off a front space of the freshness-preserving space 23 and can be pulled out by the user.

The air duct member 2153 is arranged on a side of the middle partition 2152 facing the freshness-preserving space 23, and together with the middle partition 2152 define the front section 242 of the surrounding air duct passing through the front baffle 215. The top portion of the air duct member 2153 is connected to a front baffle air inlet 2154 of the top section 241. The front end of the plurality of air guide ribs 2131 on the top insulation plate 213 can guide the airflow to the front baffle air inlet 2154.

The panel 2151 is arranged on a side of the middle partition 2152 opposite to the freshness-preserving space 23 and forms an air insulation space with the middle partition 2152. The panel 2151 can be made of glass. That is, the middle partition 2152 separates the front baffle 215 of the drawer 21 into front and rear chambers. The front chamber is the air insulation space, avoiding cooling capacity leakage. The rear chamber is the front section 242 of the surrounding air duct. The middle partition 2152 can also be made of insulating materials to further avoid cooling capacity leakage. Multiple protrusions can be formed on the side of the middle partition 2152 facing the panel 2151, thereby supporting the panel 2151.

The double-layer structure of the front baffle 215 of the drawer 21 provides a compact structure with good insulation effects. The front baffle 215 of the drawer 21 can be connected into an integral structure by decorative strips or screws and clasps, thereby improving the insulation effect. The fitting structures between the middle partition 2152, the air duct member 2153, the panel 2151, and the outer frame 2156 can use fewer parts to reasonably and simply fix them into an integral structure, such as by using clasps, hooks, and clasp holes. A lower end of the middle partition 2152 is provided with a corresponding plug-in structure, connected to a lower part of the drawer 21, thereby forming a fixed integral structure. A sealing strip can also be arranged on a rear side of the outer frame 2156 of the front baffle 215 of the drawer 21, for matching with the sealing groove at a front end of the barrel body 22 to achieve sealing of the freshness-preserving space 23.

The two sides of the drawer 21 are matched with the guide rail components of the barrel body 22, thereby allowing the whole to be slidably arranged along the front and rear direction of the barrel body 22. When the drawer 21 is retracted into the barrel body 22, a relatively sealed freshness-preserving space 23 is formed, thereby achieving preservation storage through the magnetic field applied by the magnetic field component.

Figure 9:
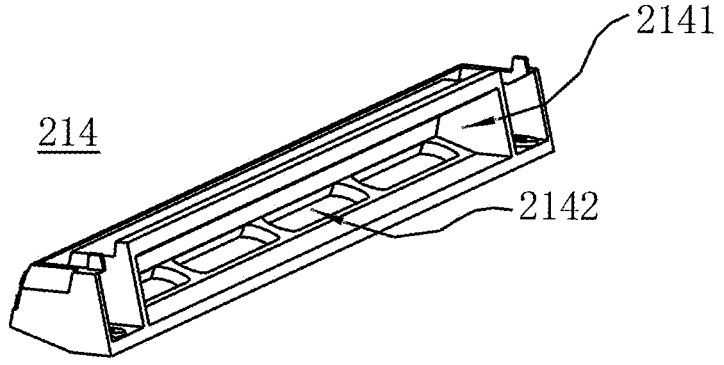
FIG. 9 is a schematic diagram of the air guide element of the magnetic field freshness-preserving apparatus in the refrigeration device according to one embodiment of the present application.

FIG. 9 is a schematic diagram of the air guide element 214 of the magnetic field freshness-preserving apparatus 20 in the refrigeration device 10 according to one embodiment of the present application. The top wall 221 of the barrel body 22 further comprises an air guide element 214. The air guide element 214 is arranged at a front end of the top wall 221 of the barrel body 22, with a first air guide opening 2141 at a rear part of the air guide element 214 communicated with a front end of the top section 241, and a second air guide opening 2142 at a bottom portion of the air guide element 214 opposite to the front baffle air inlet 2154, the second air guide opening 2142 is communicated with the front baffle air inlet 2154, thereby guiding the airflow of the top section 241 into the front section 242. The bottom portion of the air guide element 214 and the top portion of the air duct member 2153 are respectively set as inclined surfaces sloping downwards from front to back. Utilizing the air guide of the air guide element 214 can reduce air resistance and noise. A grid can be arranged at the front baffle air inlet 2154, for matching with the air guide element 214 and the duct structure of the front section 242.

The first air guide opening 2141 and the front baffle air inlet 2154 can be inclined surfaces with an angle set to 1-89°, and a gap between the front baffle air inlet 2154 and the barrel body can be 0-10 mm, with the gap filled by a sealing strip to make tight contact without hard interference. An opening area of the front baffle air inlet 2154 should be at least equal to an area of the front end of the top section 241. The air duct member 2153 can be made of ordinary plastic or thermally conductive plastic (with a thermal or insulating coating), connected to the drawer 21 and the front cover of the drawer by a specific plug-in fit, with insulating materials (such as foam, PE, or VIP) pasted inside the air duct member 2153. The front baffle air outlet 2155 at a bottom end of the air duct member 2153 allows the airflow to fully enter the bottom section 243 of the surrounding air duct, thereby ensuring uniform airflow through the bottom section 243.

The drawer bottom plate and the bottom wall 223 of the barrel body 22 are spaced apart to form the lower space, which serves as the bottom section 243 of the surrounding air duct. The front part of the drawer bottom plate has a front baffle air outlet 2155 corresponding to the bottom end of the air duct member 2153, for communicating the bottom section 243 through the front baffle air outlet 2155.

The bottom wall 223 of the barrel body 22 also comprises a plurality of layers, such as from bottom to top: an outer shell of the bottom wall, a bottom insulation plate, and a drawer bottom cover. The outer shell of the bottom wall is the lowest part of the magnetic field freshness-preserving apparatus 20, and the bottom insulation plate is used for insulation. The drawer bottom cover and the bottom of the drawer are spaced apart from each other, with a space therebetween serving as the bottom section 243 of the surrounding air duct.

Figure 10:
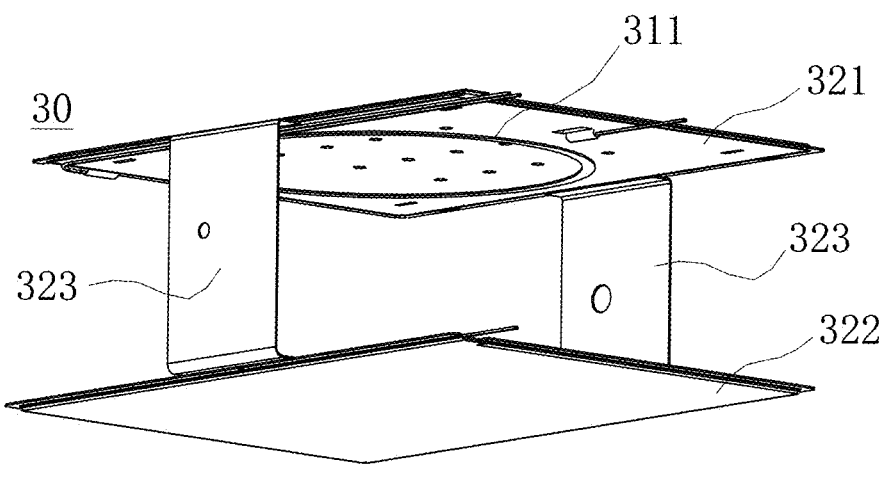
FIG. 10 is a schematic diagram of the magnetic field component of the magnetic field freshness-preserving apparatus in the refrigeration device according to an embodiment of the present application.

FIG. 10 is a schematic diagram of the magnetic field component 30 of the magnetic field freshness-preserving apparatus 20 in the refrigeration device 10 according to one embodiment of the present application.

The magnetic field component 30 comprises two sets of magnetic components respectively arranged on the drawer top cover 211 and the bottom wall 223 of the barrel body 22, The first magnetically conductive plate 321 and the first magnetic component 311 are arranged on the drawer top cover 211, with the first magnetic component 311 being flat and abutted against the first magnetically conductive plate 321.

The second magnetically conductive plate 322 and the second magnetic component (not shown) are arranged on the bottom wall 223 of the barrel body 22, with the second magnetic component being flat and arranged close to the second magnetically conductive plate 322.

The first magnetically conductive plate 321 and the second magnetically conductive plate 322 are arranged opposite to each other, and the magnetic field component 30 further comprises a magnetically conductive tape 323. The magnetically conductive tape 323 is arranged on the side wall of the barrel body 22, connecting the first magnetically conductive plate 321 and the second magnetically conductive plate 322, and forming an annular magnetic circuit around the drawer 21. The annular magnetic circuit can be made of materials with low coercivity and high permeability, and the formed magnetic circuit can be used to concentrate the magnetic field, thereby improving the uniformity of the magnetic field in the storage space while reducing the release of the magnetic field outside, minimizing interference with other components outside the magnetic field freshness-preserving apparatus 20 (such as avoiding magnetization of other components). The first magnetically conductive plate 321, second magnetically conductive plate 322, and magnetically conductive tape 323 can be made of silicon steel or similar materials.

The first magnetically conductive plate 321 and the second magnetically conductive plate 322 respectively cover the top and bottom of the freshness-preserving space 23, thereby expanding the coverage range of the magnetic field and making the magnetic field more uniform.

The first magnetic component 311 and the second magnetic component can be electromagnetic rings wound by electromagnetic coils, shaped as circles, ovals, or rectangles, and flat, with the top and bottom being flat and the thickness significantly smaller than the outer dimensions. The surrounding air duct can also remove the heat generated by the magnetic field component, thereby reducing the temperature impact on the freshness-preserving space 23.

Alternatively, in this embodiment, the magnetic field component can also use permanent magnets as magnetic elements, such as magnetic plates made of permanent magnets arranged on the top and bottom of the drawer. Additionally, a combination of electromagnetic coils and permanent magnets can also be used to generate the magnetic field.

The magnetic field helps improve storage quality, can shorten the freezing time, reduce the rate of juice loss and nutrient loss in the food, lower the number of microorganisms and bacteria, and extend the preservation period. The magnetic field freshness-preserving apparatus 20 is configured to form a surrounding air duct that flows from the air intake port 231 sequentially through the top wall 221 of the barrel body 22, the front baffle 215 of the drawer 21, and the lower space below the drawer bottom plate, and returns to the air return port 232 to refrigerate the freshness-preserving space. Further, the magnetic field and temperature control work together, using the surrounding air duct to refrigerate the freshness-preserving space 23. The cold air can also promptly remove the heat generated by the electromagnetic coils, thereby avoiding temperature fluctuations in the freshness-preserving space 23, improving the preservation effect on food in the freshness-preserving space by combining the effects of temperature and the magnetic field.

So far, it should be appreciated by those skilled in the art that while various exemplary embodiments of the application have been shown and described in detail herein, many other variations or modifications which are consistent with the principles of this application may be determined or derived directly from the disclosure of the present application without departing from the spirit and scope of the application. Accordingly, the scope of the application should be understood and interpreted to cover all such other variations or modifications.

What is claimed is:

1. A refrigeration device having a magnetic field freshness-preserving apparatus, comprising:
   a cabinet, in which a storage chamber is defined, with a refrigeration air duct for providing refrigeration airflow arranged at a back of the storage chamber;
   a magnetic field freshness-preserving apparatus, arranged in the storage chamber, provided with a magnetic field component for applying a magnetic field to a freshness-preserving space inside itself; and the magnetic field freshness-preserving apparatus comprising:
   a barrel body defining an air intake port and an air return port at a rear part thereof, and the air intake port and the air return port communicated with the refrigeration air duct;
   a drawer slidably arranged inside the barrel body, and defining the freshness-preserving space inside thereof;
   wherein the magnetic field freshness-preserving apparatus is configured to form a surrounding air duct that allows airflow to flow from the air intake port sequentially through a top wall of the barrel body, a front baffle of the drawer, and a lower space below a bottom plate of the drawer, and return to the air return port to refrigerate the freshness-preserving space; and
   wherein the front baffle of the drawer comprises:
      a middle partition;
      an air duct member arranged on the side of the middle partition facing the freshness-preserving space, together with the middle partition defining the front section of the surrounding air duct passing through the front baffle, with the top portion of the air duct member connected to a front baffle air inlet of the top section;
      a panel arranged on a side of the middle partition opposite to the freshness-preserving space, an air insulation space is forming between the panel and the middle partition.

2. The refrigeration device having the magnetic field freshness-preserving apparatus according to claim 1, wherein the top wall of the barrel body comprises:
   a drawer top cover, opposite to a top opening of the drawer;
   an outer shell plate, arranged above the drawer top cover, with a first interval between the outer shell plate and the drawer top cover;
   a top insulation plate, arranged in the first interval, with a space between the top insulation plate and the drawer top cover forming a top section of the surrounding air duct passing through the top wall of the barrel body; and
   a plurality of through holes arranged on the drawer top cover to communicated the freshness-preserving space with the top section through the through holes.

3. The refrigeration device having the magnetic field freshness-preserving apparatus according to claim 2, wherein a plurality of air guide ribs are formed on a side of the top insulation plate facing towards the drawer top cover to guide the airflow in the top section, thereby ensuring that the airflow evenly flows through the top section.

4. The refrigeration device having the magnetic field freshness-preserving apparatus according to claim 2, wherein the magnetic field component comprises a first magnetically conductive plate and a first magnetic component, the first magnetically conductive plate and the first magnetic component are arranged on the drawer top cover, the first magnetic component is flat and abutted against the first magnetically conductive plate.

5. The refrigeration device having the magnetic field freshness-preserving apparatus according to claim 4, wherein the magnetic field component comprises a second magnetically conductive plate and a second magnetic component, the second magnetically conductive plate and the second magnetic component are arranged on a bottom wall of the barrel body, the second magnetic component is flat and abutted against the second magnetically conductive plate,
   the first magnetically conductive plate and the second magnetically conductive plate are arranged opposite to each other, and the magnetic field component further comprises:
   a magnetically conductive tape arranged on the side wall of the barrel body, connecting the first magnetically conductive plate and the second magnetically conductive plate to form an annular magnetic circuit around the drawer.

6. The refrigeration device having the magnetic field freshness-preserving apparatus according to claim 4, further comprising:

a first temperature detection component and a second temperature detection component, respectively arranged inside the drawer top cover, and wherein the first temperature detection component is located near the air intake port, the second temperature detection component is located near the front baffle of the drawer.

7. The refrigeration device having the magnetic field freshness-preserving apparatus according to claim 1, wherein the top wall of the barrel body further comprises:

an air guide element arranged at a front end of the top wall of the barrel body, a first air guide opening at a rear portion of the air guide element is communicated with a front end of the top section, a bottom portion of the air guide element is opposite to the front baffle air inlet, a second air guide opening is arranged at the bottom portion of the air guide element and communicated with the front baffle air inlet, to guide the airflow of the top section into the front section, the bottom portion of the air guide element and the top portion of the air duct member respectively set as inclined surfaces sloping downwards from front to back.

8. The refrigeration device having the magnetic field freshness-preserving apparatus according to claim 1, wherein the bottom plate of the drawer and the bottom wall of the barrel body are spaced apart to form the lower space, for serving as the bottom section of the surrounding air duct;

the front part of the bottom plate of the drawer has a front baffle air outlet corresponding to the bottom end of the air duct member, connecting the bottom section through the front baffle air outlet.

9. The refrigeration device having the magnetic field freshness-preserving apparatus according to claim 1, wherein the rear wall of the barrel body is spaced apart from the back of the storage chamber, and the air return port is arranged in the middle of the rear wall; and the top end of the rear wall extends obliquely towards the rear end of the top wall of the barrel body to form an oblique extension surface, and the air intake port is arranged on the oblique extension surface.

* * * * *